Oct. 10, 1967 D. W. BOWDEN ET AL 3,346,092
DISCHARGE ASSEMBLIES FOR SCREW CONVEYORS
Filed Jan. 6, 1965 3 Sheets-Sheet 1

INVENTORS
DONALD W. BOWDEN
JON E. JOHNSON
BY
ATTORNEYS

Oct. 10, 1967  D. W. BOWDEN ETAL  3,346,092
DISCHARGE ASSEMBLIES FOR SCREW CONVEYORS
Filed Jan. 6, 1965  3 Sheets-Sheet 3

INVENTORS
DONALD W. BOWDEN
JON E. JOHNSON
BY
*Malcolm S. Bradway*
ATTORNEYS

United States Patent Office 3,346,092
Patented Oct. 10, 1967

3,346,092
**DISCHARGE ASSEMBLIES FOR
SCREW CONVEYORS**
Donald W. Bowden, Arlington Heights, and Jon E. Johnson, Chicago, Ill., assignors to Materials Handling Equipment Co.
Filed Jan. 6, 1965, Ser. No. 423,879
5 Claims. (Cl. 198—1)

The present invention is directed to certain new and useful improvements in material handling and conveying structures such as are exemplified by elongated tubelike structures having screw conveyors therein. The invention is particularly concerned with improved discharge opening and closing facilities for such structures.

Material handling and conveying structures of this class are customarily provided with one or more discharge openings along the length thereof. Some form of gate or closure is associated with each opening so as to allow selective opening of the closure or gate to allow egress of materials through the discharge opening. Material handling structures of this class may at times carry liquid or semi-liquid materials, which may take the form of the material being handled within the tube or a cleansing fluid which is circulated through the tube from time to time for cleaning purposes. Heretofore, difficulty has been encountered in insuring that the closure for the discharge opening will be watertight so as to prevent leakage of material being conveyed through a closed discharge opening and gate or leakage of the cleansing liquid which is circulated through the tube. Leakage of cleaning fluid through the discharge opening may contaminate material storage bins which are customarily located beneath the boundaries of discharge openings. Leakage of the material being conveyed may tend to clog the closure member and/or cause undesired discharge of the material being conveyed.

With the foregoing in mind, the present invention has for its major purposes the provision of an improved closure gate and sealing means therefor which are so formed as to cooperate with the discharge opening in effecting a liquid-tight seal around the opening when the gate is closed, to so arrange a closure gate with the discharge opening that the gate is effective to seal the discharge opening through the entire 360° circumference of the material handling tube, thus effectively sealing the tube against egress of its contents even though the tube is entirely filled, to so arrange a closure gate that any leakage which may occur with seal failure when the gate is closed will take place outside of the discharge area, and to so arrange the discharge gate for the discharge opening in such a conveying tube that it may function efficiently when the tube is disposed at an angle from the horizontal to the vertical position.

A related purpose of the invention is to so form a gate and seal structure for discharge openings in a conveying tube that wear on the sealing facilities therefore is minimized.

Another related purpose of the invention is to so form a conveying tube, discharge opening and discharge gate therefor that an actuator for the gate may be positioned closely adjacent the conveying tube at virtually any location around the circumference of the tube, thus accommodating the structure to a variety of space availability situations.

Another related purpose of the invention is to so arrange a discharge opening and gate structure for conveyors that contamination of sealing facilities for the gate or closure member is minimized.

A still further purpose of the invention is to arrange a closure gate with mounting facilities which compensate for manufacturing tolerances and maintain proper clearances between the gate and its associated structure.

These and other purposes will appear more fully from time to time in the course of the ensuing specification and claims, when taken with the accompanying drawings, in which:

Like elements are designated by like characters throughout the specification and drawings.

Figure 1:
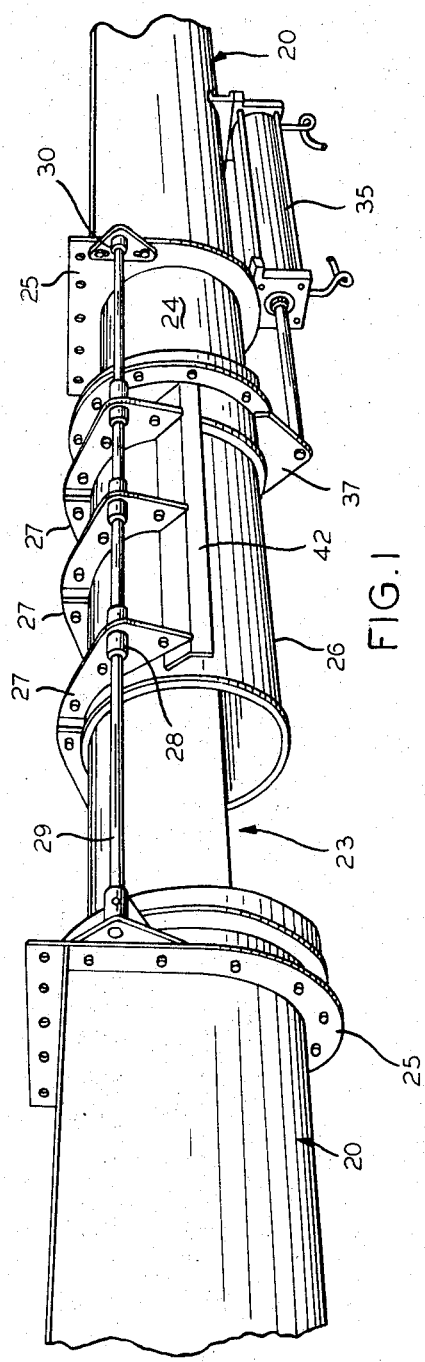
FIGURE 1 is a perspective view of a conveyor installation embodying the principles of the present invention.

With particular reference now to the drawings, and in the first instance to FIGURE 1, numeral 20 designates an elongated material handling and conveying tube. Tube 20 may be conveniently formed in sections with a generally parabolic cross section and with a flat top although it may have other cross-sectional configurations, such as, for example, a circular cross section. A conveying means in the form of a screw conveyor, diagrammatically represented at 20, is positioned in tube 20 and may be driven by any suitable mechanism such as is diagrammatically represented by the electric motor 22. The conveying means 21 may extend throughout the length of the conveying and handling tube 20, or, in some instances, it may extend only through a portion of the length of the material handling tube. Material handling and conveying tubes of this type may be utilized to convey, handle and/or mix solid materials, such as may be represented by ground meat or other food products, wet paper pulp, and toxic or non-toxic chemicals. In some cases material handling and conveying installations of this class may be utilized to handle liquid or semi-liquid slurries of such material. The material handling tube 20 has one or more discharge openings formed at one or more portions in the length thereof as is represented by the discharge opening 23 appearing in FIG- URE 1. Opening 23 may be formed at any point in the periphery of the tube. For a gravity discharge, discharge opening 23 may be formed by simply cutting away a lower half section of a tube section. The cut-away portion may form approximately one-half of the circumference of the tube. Discharge opening 23 is formed at a position over a material receiving bin which is diagrammatically represented by B in FIGURE 2.

Discharge opening 23 may be formed in the material of the tube itself or may be formed in a specially formed gate or discharge section 24 as is illustrated in the drawings. The discharge section 24 is formed essentially as a continuation of the remainder of the material handling and conveying tube 20 while preferably having a circular cross section. The discharge section 24 of the tube is coupled to the other portions of tube 20 and in longitudinal alignment therewith through use of coupling plates or collars 25 which are positioned at each end of the discharge section 24. The discharge section 24 is coupled to the other portions of the tube by bolting the collars of the discharge portion to mating collars or flanges on the opposed end portions of the main tube 20.

In order to selectively open and close discharge opening 23, a gate or closure member 26 is formed around the discharge section 24. Gate 26 is formed with a cross section matching the cross-sectional configuration of the discharge section 24, while having an internal diameter slightly larger than the external diameter of the discharge portion 24 to provide clearance therebetween. Gate 26 has a length which is longer than the length of the discharge opening taken longitudinally thereof.

Figure 3:
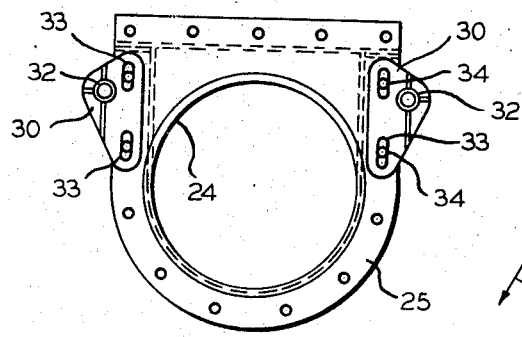
FIGURE 3 is an end view of certain mounting elements utilized with the structures of FIGURES 1 and 2 and looking in the direction of the arrows 3—3 of FIGURE 2.
Figure 4:
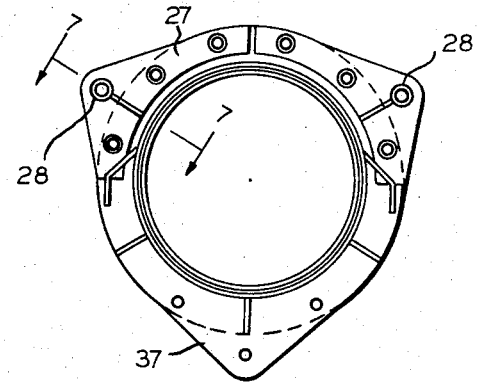
FIGURE 4 is an end view of certain other mounting elements utilized with the structure of FIGURES 1 and 2 and looking in the direction of the arrows 4—4 of FIGURE 2.
Figure 5:
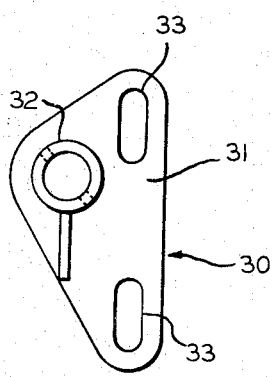
FIGURE 5 is a detailed view of a mounting bracket appearing in FIGURE 3.
Figure 6:
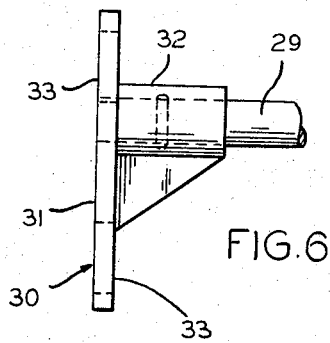
FIGURE 6 is a side view of certain elements illustrated in FIGURE 5.
Figure 7:
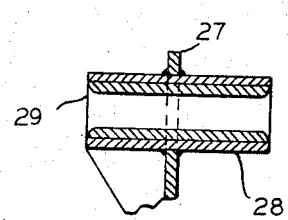
FIGURE 7 is a detailed cross section of certain elements shown in FIGURE 4 and taken on the section lines 7—7 of FIGURE 4.
Figure 8:
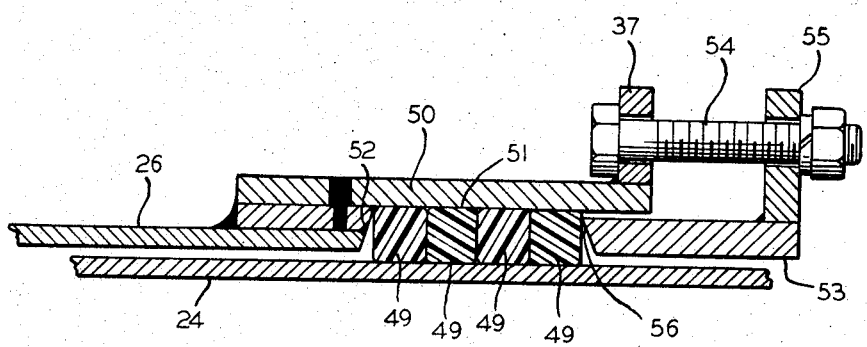
FIGURE 8 is a sectional view of certain sealing facilities utilized with the structure of FIGURES 1 and 2.

In order to support gate 26 in surrounding relation to the discharge portion 24 and for reciprocation with respect thereto, a plurality of spaced guide supports 27 are fixed to the exterior of the gate. Guide supports 27 may take the form of plates which are welded or otherwise fixed to the exterior of the gate. Each guide support includes cylindrical guides 28 which are passed through the supports 27, as appears in FIGURE 7. Each cylindrical guide may consist of an outer cylindrical member along with an inner cylindrical member 29 of a suitable bearing material. Supporting rods 29 are passed through the guides 28 and are secured to the collars 25 through means of mounting brackets 30. Each mounting bracket, as appears in FIGURES 3, 5 and 6, includes a plate 31 having a cylindrical boss 32 to receive an end of one of the mounting rods 29. Each plate includes slots 33 for the reception of bolts 34 which are passed therethrough and into the collars 25 so as to fix the mounting brackets in position.

The mounting brackets are so located on the collars 25 that the slots 33 extend in directions away from the periphery of the discharge portion 24. They are preferably so arranged that they extend tangentially with respect thereto. This provides for adjustment of each mounting bracket 30 in a direction toward and away from the wall of discharge portion 24 and enables adjustment of the supporting rods 29 at the opposite ends thereof, to assure the maintenance of clearance between the discharge gate 26 and the discharge portion 24, while also assuring substntial concentricity between these elements.

Figure 2:
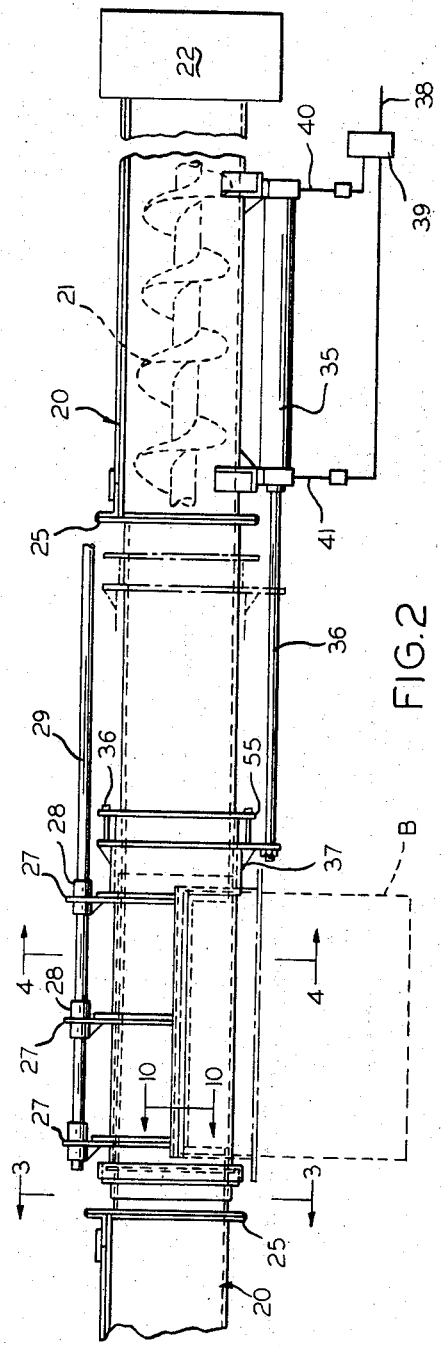
FIGURE 2 is a side view of the structure illustrated in FIGURE 1 while illustrating certain elements in a different operative position.

In order to reciprocate the gate 26 to and from the open and closed positions illustrated in FIGURES 1 and 2, an extensible actuator, as represented by the air cylinder 25, may be fixed to some support as, for example, the tube 20 and have the piston rod thereof coupled to a circular flange 37 at the end portion of the gate 26 nearest thereto. Actuators 35 may be located underneath the conveying tube or at virtually any point in the circumference of the tube, depending upon availability of space in the particular installation. Cylinder 35 may be actuated from any suitable source of pressure as is diagrammatically represented by line 38 while being controlled by a suitable valve 39 which selectively supplies fluid under pressure through lines 40 and 41 to opposite ends of the cylinder.

Figure 10:
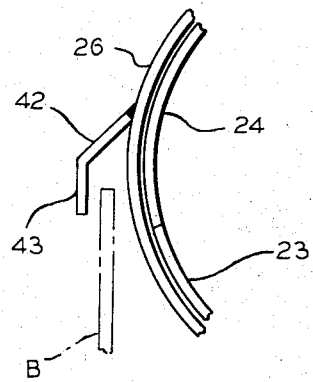
FIGURE 10 is a diagrammatic view of a portion of a gate structure illustrated in FIGURES 1 and 2 while illustrating its relation to a storage bin.

Gate 26 may have shields 42 at opposite sides thereof and fixed to the plates 27 and flange 37 to provide longitudinal reinforcement of these elements. Shield 42 may include a downwardly directed and outwardly spaced portion 43 which is so positioned as to overlie the storage bin B as appears in FIGURE 10.

Figure 9:
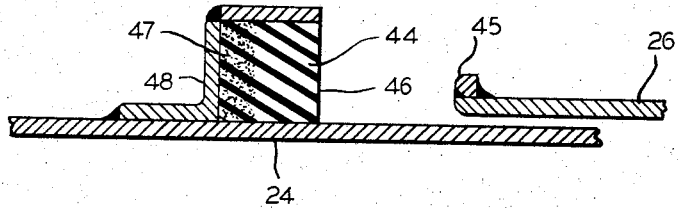
FIGURE 9 is a sectional view of certain other sealing elements utilized with the structure of FIGURES 1 and 2.

Sealing means are provided between the gate 26 and discharge portion 24 on opposite sides of the discharge opening 23 and spaced outwardly from the boundary edges thereof. One seal takes the form of a static seal which appears in detail in FIGURE 9. This seal is defined by a circumferentially extending resilient sealing ring 44 and the opposed circumferentially extending edge 45 of gate 26. Edge 45 is preferably rounded and built up to provide a relatively blunt area at the end edge. Ring 44 is preferably formed in two sections which are fixed together. One of these is the sealing section or facing section 46 which is adapted for contact with the edge 45. The other ring section is composed of a more compressible back-up material 47 which is bonded to the facing material 46. Facing material 46 should be a wear resistant material such as is exemplified by gum rubber. The backing material 47 may be composed of a yieldable rubber-like material such as 45 durometer Neoprene. The backing material allows some yieldability of the ring as a whole when the ring is engaged under compression by the confronting edge 45 of the gate. This yieldability insures a tight fit between the facing material 46 and the edge 45 of the gate throughout the circumference of the conveying tube. Sealing ring 44 is positioned within a trough-like structure which may be defined by an annular member 48 which is fixed to the exterior wall of the discharge portion 24 of the tube with the opening to the trough facing the edge 45. Seal ring 44 is positioned within this trough-like structure and cemented to the exterior wall of the discharge portion 24 and to the side walls of the structure 48.

The other end portion of the gate or closure member 26 is sealed by a dynamic seal between the closure member and the exterior wall of the discharge portion 24. This seal is spaced from the edge 45 of the closure gate, by a distance greater than the spacing of the ring 44 from the edge of the discharge opening most remote therefrom so that this seal engages the discharge portion 24 at a location spaced from the discharge opening when the seal ring 44 is engaged with edge 45. This seal is defined by a plurality of annular seal rings 49 which are positioned side by side. These rings may be formed from a Teflon asbestos packing or similar material. The rings 49 are so formed that they have a relatively close fitting engagement with the exterior surface of the discharge portion 24. They are confined between this surface and a portion 50 of the flange 37. Portion 50 provides an annular confining surface 51 which is spaced from the exterior surface of the closure member 24 by a distance slightly greater than the radial spacing between the discharge gate 26 and the discharge portion 24. Longitudinal movement of the ring with respect to the discharge gate 26 is prevented by a stop surface 52 at an inner end of portion 50 and an extensible compression member 53 on the other side of the group of rings. The compression member 53 takes the form of a ring surrounding discharge portion 24. Compression exerting means in the form of a plurality of bolts 54 may be spaced circumferentially of the gate and passed between flange 37 and an outwardly extending flange 55 on ring 53. It should be noted the ring has an inner tapered surface providing a relatively sharp circular edge 56 for engagement with the opposed side of the confronting seal ring but at a point close to the confining portion 50. The stop surface 52 is also tapered so that when the bolts 54 are tightened compression is exerted on the rings at points closer to their outer circumferences than to their inner circumferences. When compression is thus exerted on these rings, the rings will be expanded radially inwardly and outwardly so as to form a fluid-tight seal with the surface 51 as well as the exterior surface of the discharge portion 24. When gate 26 is reciprocated, the rings 49 slide along the exterior surface of the discharge portion 24 while maintaining the fluid-tight seal.

When the gate member is installed over the discharge portion 24 the mounting brackets 30 for the supporting rods should be so adjusted that substantially the entire weight of the gate 26 is supported on the rods with little or no weight on the gate being transferred to the rings 49. This insures that the rings 49 may be properly expanded in radial directions and form their fluid-tight seal. When installing the system, the closure member 26 is fitted over the discharge section 24 of the conveying tube and fitted so that the supporting rods 23 maintain substantially the same clearance between the closure tube and the material conveying tube throughout the entire circumference and length of the conveying tube. Adjustment of the rod mounting brackets 30 at one end or the other, or both, will insure such clearance. The position of the rods 29 is so adjusted that the clearance at the dynamic seal end of the closure member 26 and between the member and conveying tube 20 is substantially the same when the closure member is in the fully opened or fully closed position. The packing gland compression member 53 is adjusted so that the packing rings are expanded radially inwardly and outwardly with respect to the conveying tube 20 so as to form a fluid-tight seal between the exterior surface of the conveying tube and the confining flange portion 50 of the closure member.

The pneumatic actuator 35 is fixed to one section of the conveying tube 20 at a convenient location thereon in accordance with available space in the area around the tube. It may be conveniently fitted on the bottom of the conveying tube 20 when the conveying tube is supported above floor level and in a substantially horizontal position.

At times during the material handling or conveying operation, the closure member 26 is in the fully closed position as illustrated in FIGURE 2. In this position, the end 45 of the closure member bears tightly against the opposed sealing ring 44 at all points in the circumference of the conveying tube. The back-up ring may be compressed somewhat to insure that the outwardly facing sealing ring and opposed end of the closure member form a fluid-tight fit throughout the entire periphery of the ring. This forms a fluid-tight seal on one side of the discharge opening. The tight fitting engagement of the packing rings 49, which are confined between the conveying tube 20 and the confining flange portion 50 of the closure member, form a fluid-tight seal around the entire periphery of the conveying tube, but at the other side of the discharge opening.

When handling fluids, the seals are effective throughout the periphery of the tube. If any leakage occurs, as may happen with seal failure, leakage will take place at points spaced from the storage bin B and outside the discharge area due to the closure being longer than the opening while the seals are spaced outwardly of the boundary edges of the opening.

When it is desired to discharge contents from the tube and through the discharge opening, the actuator 35 is operated so as to withdraw the closure member 26 from the position illustrated in FIGURE 2 to the open position of FIGURE 1 whereupon contents within the conveying tube 20 may discharge by gravity and with and/or without motivation from the conveyor within the tube. It should be noted that in the withdrawn position of the closure member, the packing rings will maintain a sliding, fluid-tight seal between the conveying tube 20 and the closure member 26 while the other seal at the opposite side of the discharge opening is broken.

In order to avoid contamination of the packing rings, a wiper or scraper may be located on the external peripheral surface of the conveying tube at a point closely adjacent to the bounding edge of the discharge opening and in engagement with the internal peripheral surface of the closure member. This may act to shield the packing rings 49 from contamination by any contents which are carried within the conveying tube.

Through use of the reciprocating form of discharge gate as disclosed herein, the discharge opening from the tube may be closely regulated from a relatively narrow opening to a relatively long opening, all by selective positioning of the closure member.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. In a discharge system for material carrying tubes, an elongated material carrying tube having a discharge opening formed in one portion thereof, a closure tube mounted in surrounding relation to said carrying tube and completely enclosing the portion of the carrying tube positioned within said closure tube, means for reciprocating said closure tube with relation to said carrying tube to and from one position overlying and closing said opening and a position spaced therefrom to allow discharge from said opening, first seal means on one side of said opening and second seal means positioned on said other side of said opening, both of said seal means being spaced longitudinally from opposite boundary edges of said opening to thereby provide a space between the opposite boundary edges of said opening and each seal means, said first seal means being carried by said closure tube and having a sliding, sealing engagement with the exterior wall of said carrying tube completely around said carrying tube to form a fluid tight seal with said tube, said second seal means being positioned on the other side of said opening and comprising a resilient sealing ring surrounding one of said tubes and fixed thereto, an annular surface carried by the other of said tubes and opposed to said ring and cooperable therewith to seal said opening in fluid tight relation when said closure tube is in said overlying position, and means for supporting said closure tube on said carrying tube including a plurality of elongated rods and guides on said closure tube in slidable engagement with said rods, said rods being supported by bracket means on said carrying tube at points spaced longitudinally of said opening and said closure tube.

2. The system of claim 1 wherein said annular surface is defined by the end of said closure tube and said seal ring is carried by said carrying tube.

3. The system of claim 1 wherein said seal means includes an annular trough-like seal housing fixed to said carrying tube and extending around said carrying tube, said housing having an annular opening facing said closure tube, said resilient sealing ring being formed with a wear resistant rubber-like facing fixed to a relatively soft rubber backing and confined within said housing, said annular end surface being on said closure tube, said facing being opposed to said annular end surface and being cooperable therewith to form said second seal means.

4. The system of claim 1 wherein said first seal means includes an annular flange on said closure tube at one end thereof and surrounding said carrying tube, said flange being radially spaced from said carrying tube, a plurality of sealing rings confined between said flange and said carrying tube, and means for compressing said rings in directions generally parallel to the axis of said carrying tube so as to force said rings outwardly into a tight sealing engagement with said flange and inwardly into a tight sealing engagement with said carrying tube.

5. The structure of claim 1 wherein said bracket means includes a plurality of brackets, each bracket being mounted on said carrying tube for adjustable positioning along a tangent with respect to the wall of said carrying tube.

References Cited

UNITED STATES PATENTS

| | | | |
|---|---|---|---|
| 2,487,693 | 12/1949 | Canon | 198—205 |
| 2,529,777 | 11/1950 | McInnis | 198—135 |
| 2,720,963 | 10/1955 | Stanley | 198—135 |
| 2,731,241 | 1/1956 | Christian | 198—213 |
| 2,961,126 | 11/1960 | Craig | 198—213 |
| 3,107,825 | 10/1963 | Reed | 198—213 |
| 3,139,860 | 7/1964 | Rutten | 198—213 |
| 3,174,806 | 3/1965 | Barber | 302—28 |
| 3,185,436 | 5/1965 | Rouang | 251—326 |
| 3,189,168 | 6/1965 | Coats | 198—213 |

EVON C. BLUNK, *Primary Examiner.*

RICHARD E. AEGERTER, SAMUEL F. COLEMAN,
*Examiners.*